United States Patent
Lee (10) Patent No.: US 11,169,569 B2
(45) Date of Patent: Nov. 9, 2021

(54) USB EXPANDING DEVICE

(71) Applicant: ASUSTeK COMPUTER INC., Taipei (TW)

(72) Inventor: Jian-Hui Lee, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/944,318

(22) Filed: Jul. 31, 2020

(65) Prior Publication Data

US 2021/0048849 A1 Feb. 18, 2021

(30) Foreign Application Priority Data

Aug. 13, 2019 (TW) .................................. 108128811

(51) Int. Cl.
| | |
|---|---|
| G06F 1/16 | (2006.01) |
| G06F 1/26 | (2006.01) |
| G06F 13/42 | (2006.01) |
| H02J 7/00 | (2006.01) |
| G06F 13/40 | (2006.01) |

(52) U.S. Cl.
CPC ............ G06F 1/1632 (2013.01); G06F 1/266 (2013.01); G06F 13/4022 (2013.01); G06F 13/4282 (2013.01); H02J 7/0042 (2013.01); G06F 2213/0042 (2013.01)

(58) Field of Classification Search
CPC .... G06F 1/1632; G06F 1/266; G06F 13/4022; G06F 13/4282; G06F 2213/0042; H02L 7/0042; H02J 7/0042
See application file for complete search history.

(56) References Cited

U.S. PATENT DOCUMENTS

| | | | | |
|---|---|---|---|---|
| 9,779,049 | B2* | 10/2017 | Chueh | .................... G06F 13/385 |
| 9,864,421 | B2 | 1/2018 | Li et al. | |
| 10,224,727 | B2 | 3/2019 | Li | |
| 10,554,140 | B1* | 2/2020 | Khamesra | ......... H02M 3/33592 |
| 2015/0318728 | A1* | 11/2015 | Ghosh | ................. G06F 13/4282 |
| | | | | 320/107 |

(Continued)

FOREIGN PATENT DOCUMENTS

| | | |
|---|---|---|
| CN | 101097560 A | 1/2008 |
| CN | 107809122 A | 3/2018 |

(Continued)

Primary Examiner — Henry Tsai
Assistant Examiner — Christopher A Daley
(74) Attorney, Agent, or Firm — McClure, Qualey & Rodack, LLP (57) ABSTRACT

The disclosure provides a USB expanding device comprising a plurality of USB type-C connection units, a transmission controller, and a main controller. Each of a USB type-C connection unit includes a USB type-C port, a multiplexer, and a power transmission controller. The USB type-C port provides for connecting to an external device. The multiplexer connects to the USB type-C port and the power transmission controller. The transmission controller connects to the multiplexers of each of the USB type-C connection units for controlling the transmission of data, and the main controller connects to the power transmission controllers of each of the USB type-C connection units to distribute power according to the charging request information of the power transmission controllers.

10 Claims, 5 Drawing Sheets

(56) References Cited

U.S. PATENT DOCUMENTS

| | | | |
|---|---|---|---|
| 2016/0352101 A1* | 12/2016 | Koo | H02J 1/102 |
| 2017/0293333 A1* | 10/2017 | Liu | G06F 13/4282 |
| 2018/0067530 A1 | 3/2018 | Hsieh et al. | |
| 2018/0254648 A1* | 9/2018 | Harju | H02J 7/045 |
| 2019/0033953 A1* | 1/2019 | Kadgi | G06F 1/3287 |
| 2019/0319545 A1 | 10/2019 | Wang et al. | |
| 2020/0310512 A1* | 10/2020 | Mills | H03K 17/0822 |
| 2020/0310522 A1* | 10/2020 | Cueva | G06F 1/3209 |

FOREIGN PATENT DOCUMENTS

| | | |
|---|---|---|
| TW | 201630305 A | 8/2016 |
| TW | 201703392 A | 1/2017 |
| TW | I652580 B | 3/2019 |

\* cited by examiner

USB EXPANDING DEVICE

CROSS-REFERENCE TO RELATED APPLICATION

This application claims the priority benefit of Taiwan applications serial No. 108128811, filed on Aug. 13, 2019. The entirety of the above-mentioned patent application is hereby incorporated by reference herein and made a part of specification.

BACKGROUND OF THE INVENTION

Field of the Invention

The invention relates to a Universal Serial Bus (USB) expanding device.

Description of the Related Art

The Universal Serial Bus is widely used in various electronic products such as Universal Serial Bus Type C (USB type-C) connectors. Moreover, the USB type-C connector can operate in either of the two logical orientations, which is very convenient to use.

The external charging ports of the existing USB type-C docking station only charge a single USB type-C upstream port (a USB type-C port) on the dock, moreover, the video signal input from the USB type-C upstream port to the docking station is usually converted to a High Definition Multimedia Interface (HDMI) or DisplayPort output, and other USB ports on the docking station are used for data transmission. If electronic devices connected to other USB ports have large power demands, or the USB type-C upstream port does not connected to any electronic device, the other USB ports are fail to operate or charge well. Furthermore, the existing docking station usually does not have enough USB type-C ports for simultaneous transmitting data, images and power to each other.

BRIEF SUMMARY OF THE INVENTION

According to an aspect, a USB expanding device is provided. The USB expanding device includes a plurality of USB type-C connection units, a transmission controller and a main controller. Each of the USB type-C connection units includes a USB type-C port, a multiplexer and a power transmission controller (power delivery controller). The USB type-C port provides a connection to an external device, the multiplexer connects to the USB type-C port and the power transmission controller. The transmission controller connects to the multiplexers of each of the USB type-C connection units, for controlling the data transmission. The main controller connects the power transmission controllers of each of the USB type-C connection units, transmission for performing a power distribution according to the charging demand information obtained from the power transmission controllers.

From the above, the USB expanding device provides two or more USB type-C connection units for simultaneous transmitting data, images and power. Multiple sets of the power transmission controllers are used to collocate with the main controller. While the USB type-C connection units are transmitting data or images, the external DC power is distributed through the USB type-C connection units and the main controller according to the charging demand information or the charging protocol.

DETAILED DESCRIPTION OF THE EMBODIMENTS

Figure 1:
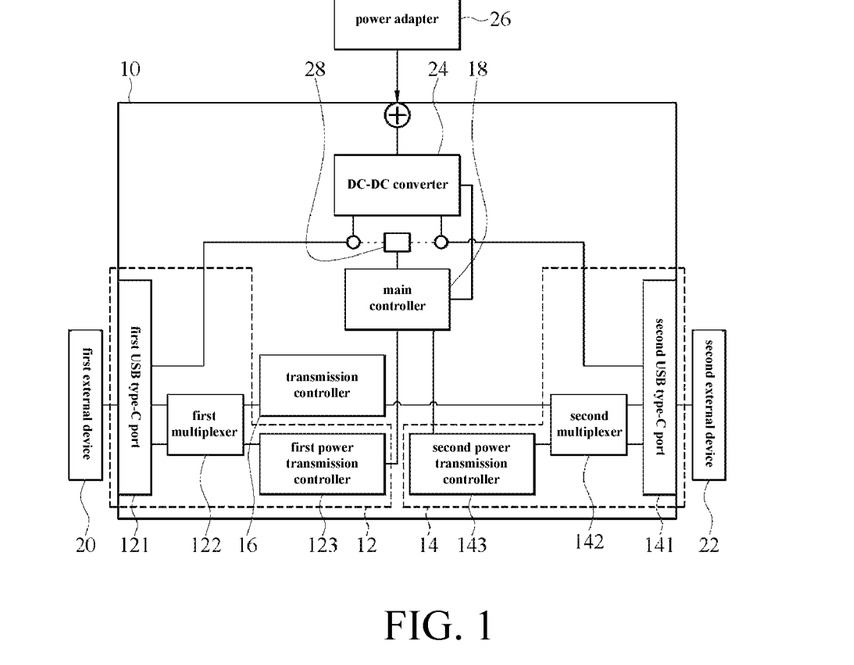
FIG. 1 is a block diagram of a USB expanding device according to a first embodiment.

FIG. 1 is a block diagram of a USB expanding device according to a first embodiment. Please refer to FIG. 1. A USB expanding device 10 includes at least two USB type-C connection units (in this embodiment, the amount of the USB type-C connection units is two, and hereafter refer to as a first USB type-C connection unit 12 and a second USB type-C connection unit 14), a transmission controller 16, and a main controller 18. The transmission controller 16 is connected to the first USB type-C connection unit 12 and the second USB type-C connection unit 14 respectively, and the main controller 18 is also connected to the first USB type-C connection unit 12 and the second USB type-C connection unit 14 respectively.

The first USB type-C connection unit 12 includes a first USB type-C port 121, a first multiplexer 122 and a first power transmission controller 123. In an embodiment, the first USB type-C port 121 is connected to a first external device 20, the first multiplexer 122 is electrically connected to the first USB type-C port 121, and the first power transmission controller 123 is electrically connected to the first multiplexer 122. Similarly, the second USB type-C connection unit 14 includes a second USB type-C port 141, a second multiplexer 142 and a second power transmission controller 143. In an embodiment, the second USB type-C port 141 is connected to a second external device 22, the second multiplexer 142 is electrically connected to the second USB type-C port 141, and the second power transmission controller 143 is electrically connected to the second multiplexer 142. The transmission controller 16 is electrically connected to the first multiplexer 122 of the first USB type-C connection unit 12 and the second multiplexer 142 of the second USB type-C connection unit 14 at the same time, for controlling data or image transmission between the first external device 20 and the second external device 22. The main controller 18 is electrically connected to the first power transmission controller 123 of the first USB type-C connection unit 12 and the second power transmission controller 143 of the second USB type-C connection unit 14, and the main controller 18 performs power distribution according to the charging demand information obtained by the first power transmission controller 123 and the second power transmission controller 143. In addition, the USB expanding device 10 includes a power converter, such as a DC-DC converter 24. The DC-DC converter 24 is electrically connected to the main controller 18, the first USB type-C port 121 of the first USB type-C connection unit 12, and the second USB type-C port 141 of the second USB type-C connection unit 14, and the DC-DC converter 24 provides the corresponding working power to the first external device 20 and the second external device 22 through the first USB type-C port 121 and the second USB type-C port 141 respectively according to the power distribution.

In an embodiment, the DC-DC converter 24 further includes a power adapter 26 such as a general power adapter or a USB power adapter. In an embodiment, the power adapter 26 converts an external AC power to a DC power and provide it to the DC-DC converter 24.

When the power adapter 26 is connected to a mains supply, the power adapter 26 converts the received external AC power to the DC power and provide it to the DC-DC converter 24. The DC-DC converter 24 converts the DC power to a DC power required by the first external device 20 and the second external device 22 for operation. In this embodiment, the main controller 18 obtains the charging demand information of the first external device 20 and the second external device 22 from the first power transmission controller 123 and the second power transmission controller 143 respectively, and then, the main controller 18 informs the DC-DC converter 24 to perform a power distribution according to the charging demand information to supply power to the first external device 20 and the second external device 22 respectively. The charging demand information of the first external device 20 and the second external device 22 respectively includes the present power state and the required power supply types (such as 5 Volts, 12 Volts, or 20 Volts) of the first external device 20 and the second external device 22.

In detail, when the main controller 18 obtains the respective charging demand information of the first external device 20 and the second external device 22 through the first power transmission controller 123 and the second power transmission controller 143, the main controller 18 informs the DC-DC converter 24 to convert the DC power to the power required by the first external device 20 and the second external device 22, and transmits the power to the first USB type-C port 121 and the second USB type-C port 141 respectively. Then, the power is supplied to the first external device 20 and the second external device 22 through the first USB type-C port 121 and the second USB type-C port 141 respectively. When the external power is used for charging, the first external device 20 and the second external device 22 still transmit data or images through the data transmission channel that established by the first USB type-C port 121, the multiplexer 122, the transmission controller 16, the second multiplexer 142, and the second USB type-C port 141.

In an embodiment, the USB expanding device 10 further includes a switching element 28 which is electrically connected to the main controller 18. The switching element 28 is also connected between the first USB type-C port 121 of the first USB type-C connection unit 12 and the second USB type-C port 141 of the second USB type-C connection unit 14. Moreover, the switching element 28 is connected with the DC-DC converter 24 in parallel to use the main controller 18 to control the switching element 28 to conduct selectively, for transmitting power between the first external device 20 and the second external device 22. In other words, when the external power is not connected with the USB expanding device 10, the main controller 18 controls the switching element 28 to be switched on, so that the first external device 20 and the second external device 22 establish a power transmission channel through the first USB type-C port 121, the conductive switching element 28, and the second USB type-C port 141 for power transmission. At this time, the first power transmission controller 123 and the second power transmission controller 143 communicate with each other through the main controller 18 to choose the charging protocol between the first external device 20 and the second external device 22, and then the first power transmission controller 123 and the second power transmission controller 143 perform power transmission according to the charging protocol. In an embodiment, the content of the charging protocol includes at least one of a present power states of the first external device 20 and the second external device 22, the power is supplied from the first external device 20 to the second external device 22 or from the second external device 22 to the first external device 20, and the available power supply types (e.g. 5 volts, 12 volts or 20 volts). When the present power of the first external device 20 is larger than that of the second external device 22, the first external device 20 provides a list of available power supply types (e.g. 5 Volts, 12 Volts, or 20 Volts) for the second external device 22 to select through the first power transmission controller 123. The second external device 22 can only select one power supply type from the list of the power supply types to inform the first external device 20 to supply power, then, the first external device 20 performs power transmission according to the power supply type selected by the second external device 22 to supply power to the second external device 22. Conversely, when the present power state of the second external device 22 is larger than that of the first external device 20, the second external device 22 provides a list of available power supply types for the first external device 20 to select through the second power transmission controller 143, and then, the second external device 22 performs power transmission according to the power supply type selected by the first external device 20 to supply power to the first external device 20. At this time, the first external device 20 and the second external device 22 continue to transmit data or images through the data transmission channel established by the first USB type-C port 121, the multiplexer 122, the transmission controller 16, the second multiplexer 142, and the second USB type-C port 141.

Figure 2:
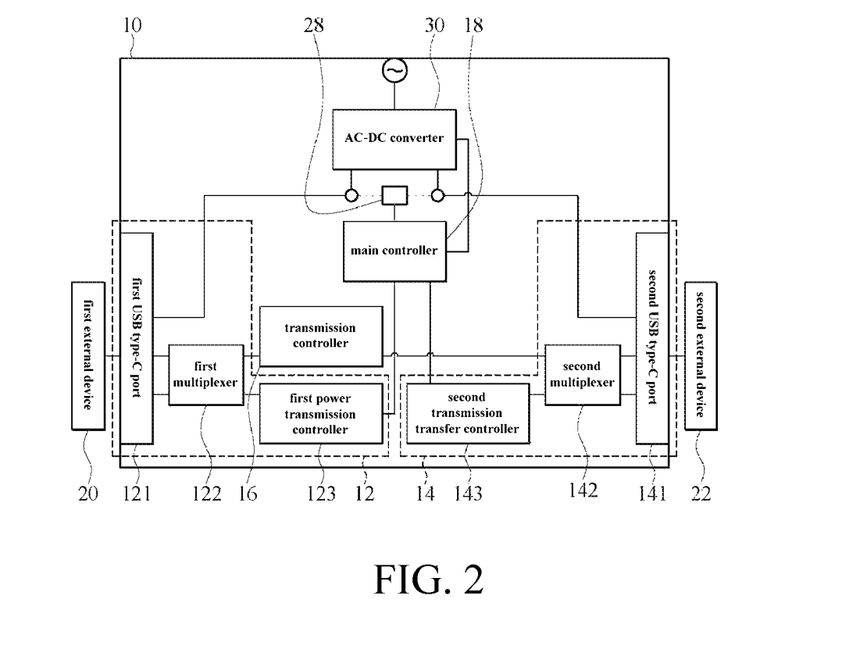
FIG. 2 is a block diagram of a USB expanding device according to a second embodiment.

FIG. 2 is a block diagram of a USB expanding device of a second embodiment. Please refer to FIG. 2. The USB expanding device 10 uses an AC-DC converter 30 as a power converter. The AC-DC converter 30 is electrically connected to the main controller 18, the first USB type-C port 121 of the first USB type-C connection unit 12, and the second USB type-C port 141 of the second USB type-C connection unit 14, for receiving an external AC power and converting it to the DC power, and then converting the DC power source into a required power supply types of the first external device 20 and the second external device 22. The connection relationships and the operations of the rest are the same as in the first embodiment, which is not repeated here.

In an embodiment, the AC-DC converter 30 further connects to a transmission line with a plug (not shown), for plugging the plug into the socket which provides a mains supply, to supply the external AC power of the mains supply to the AC-DC converter 30, and then the AC-DC converter 30 converts the external AC power to the DC power.

Figure 3:
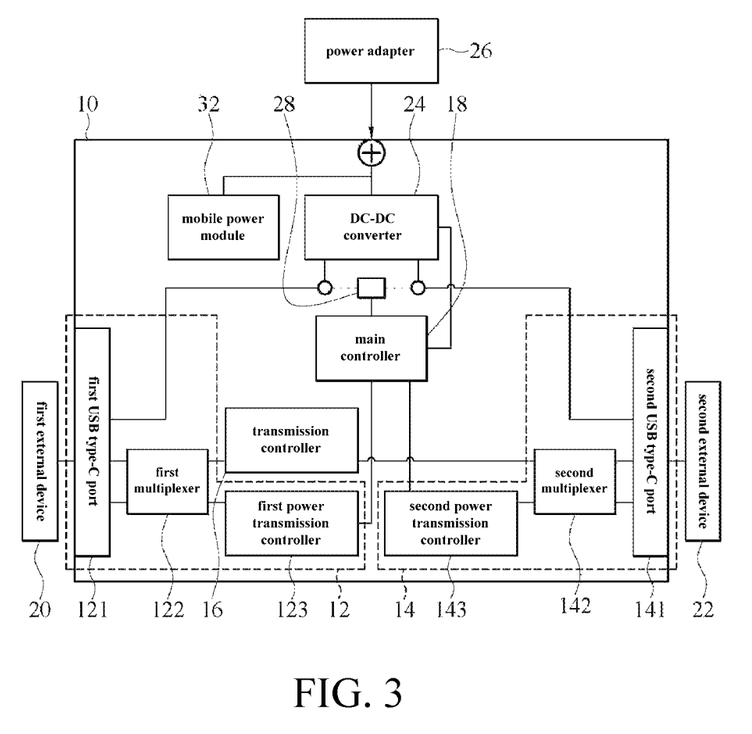
FIG. 3 is a block diagram of a USB expanding device according to a third embodiment.

FIG. 3 is a block diagram of a USB expanding device according to a third embodiment. As shown in FIG. 3, the USB expanding device 10 further includes a mobile power module 32. The mobile power module 32 is electrically connected to the DC-DC converter 24, to selectively provide the DC power to the DC-DC converter 24. The DC-DC converter 24 further connects to a power adapter 26 such as a general power adapter or a USB power adapter. In an embodiment, the power adapter 26 converts an external AC power to the external DC power to supply to the DC-DC converter 24. When the power adapter 26 inputs the DC power to the DC-DC converter 24, it also charges the mobile power module 32 at the same time. Then, the DC-DC converter 24 provides the external DC power to charge the first external device 20 and the second external device 22 through the first USB type-C port 121 and the second USB type-C port 141 respectively, so that the corresponding power supply type is supplied to the first external device 20 or the second external device 22. When no external DC power is provided in the USB expanding device, the mobile power module 32 provides the DC power to the DC-DC converter 24, and then the DC-DC converter 24 charges the first external device 20 and the second external device 22 through the first USB type-C port 121 and the second USB type-C port 141 respectively. When the power of the mobile power module 32 is exhausted and cannot provide power, the main controller 18 controls the switching element 28 to be switched on, so that the first external device 20 and the second external device 22 perform power transmission through the power transmission channel established by the first USB type-C port 121, the conductive switching element 28 and the second USB type-C port 141. At this time, the first power transmission controller 123 and the second power transmission controller 143 communicate with each other through the main controller 18 to choose the charging protocol between the first external device 20 and the second external device 22, and then, the first power transmission controller 123 and the second power transmission controller 143 perform power transmission according to the charging protocol. In an embodiment, the content of the charging protocol includes the present power states of the first external device 20 and the second external device 22, the power is supplied from the first external device 20 to the second external device 22 or from the second external device 22 to the first external device 20, and available power supply types (e.g. 5 volts, 12 volts or 20 volts). The transmission of data or images is not affected by the foregoing charging modes. At this time, the first external device 20 and the second external device 22 continue to transmit data or images through the data transmission channel established by the first USB type-C port 121, the multiplexer 122, the transmission controller 16, the second multiplexer 142, and the second USB type-C port 141.

Figure 4:
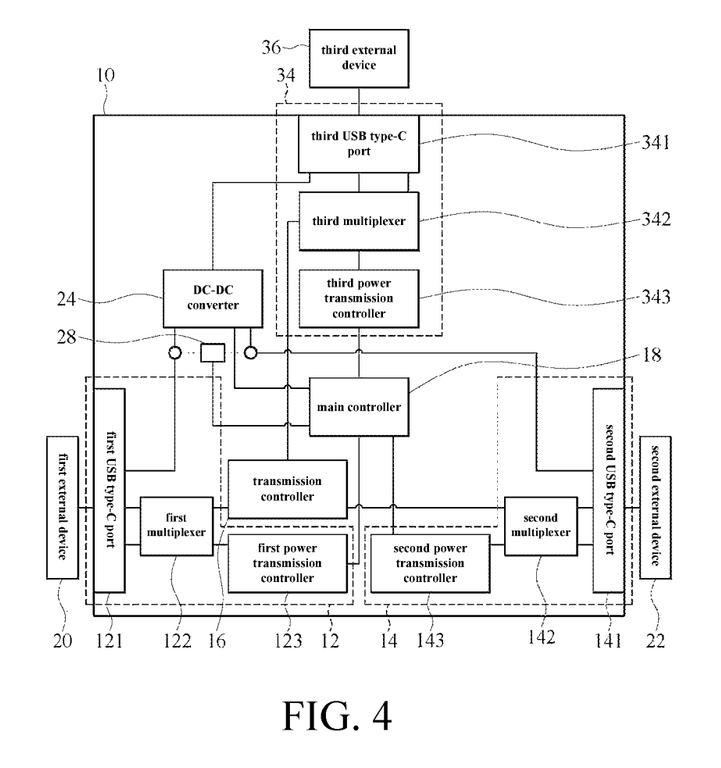
FIG. 4 is a block diagram of a USB expanding device according to a fourth embodiment.

FIG. 4 is a block diagram of a USB expanding device according to a fourth embodiment. As shown in FIG. 4, the USB expanding device 10 further includes a charging connection unit. In this embodiment, the charging connection unit is a third USB type-C connection unit 34. As shown in FIG. 4, the third USB type-C connection unit 34 includes a third USB type-C port 341, a third multiplexer 342, and a third power transmission controller 343. In an embodiment, the third USB type-C port 341 is connected with a third external device 36 which provides an external DC power, the third multiplexer 342 is electrically connected to the third USB type-C port 341, and the third power transmission controller 343 is electrically connected to the third multiplexer 342. The transmission controller 16 is electrically connected to the multiplexer 122 of the first USB type-C connection unit 12, the second multiplexer 142 of the second USB type-C connection unit 14 and the third multiplexer 342 of the third USB type-C connection unit 34 at the same time, for controlling data transmission between the first external device 20, the second external device 22, and the third external device 36. The main controller 18 is electrically connected to the first power transmission controller 123 of the first USB type-C connection unit 12, the second power transmission controller 143 of the second USB type-C connection unit 14, and the third power transmission controller 343 of the third USB type-C connection unit 34. The main controller 18 performs power distribution according to the respective charging demand information obtained by the first power transmission controller 123, the second power transmission controller 143 and the third power transmission controller 343.

In an embodiment, the DC-DC converter 24 is electrically connected to the main controller 18, the first USB type-C port 121, the second USB type-C port 141 and the third USB type-C port 341. When the DC power provided by the third external device 36 is transmitted to the DC-DC converter 24 through the third USB type-C port 341, the main controller 18 obtains the respective charging demand information of the first external device 20 and the second external device 22 from the first power transmission controller 123 and the second power transmission controller 143 respectively, and then, the main controller 18 informs the DC-DC converter 24 to perform power distribution according to the charging demand information, and then supplies power to the first external device 20 and the second external device 22 through the first USB type-C port 121 and the second USB type-C port 141 respectively. When the third external device 36 is disabled to supply the DC power the main controller 18 controls the switching element 28 to be switched on, so that the first external device 20 and the second external device 22 perform power transmission through the power transmission channel established by the first USB type-C port 121, the conductive switching element 28, and the second USB type-C port 141. Of course, no matter what the foregoing charging modes are, the transmission of data or images is not affected. At this time, the first external device 20, the second external device 22 and the third external device 36 continue to transmit data or images through the data transmission channel established by the first USB type-C port 121, the multiplexer 122, the transmission controller 16, the second multiplexer 142, the second USB type-C port 141, the third multiplexer 342, and the third USB type-C port 341.

Figure 5:
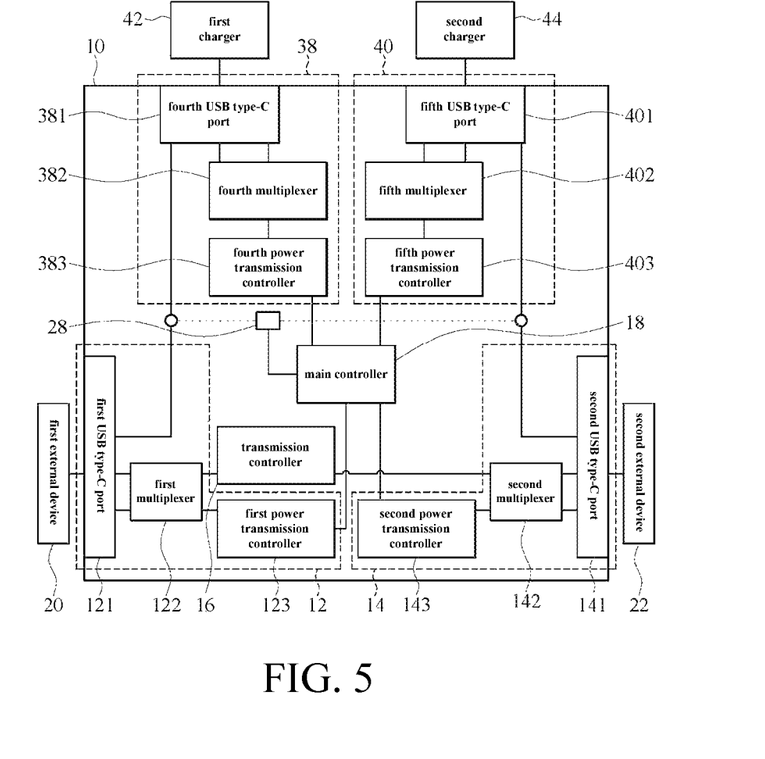
FIG. 5 is a block diagram of a USB expanding device according to a fifth embodiment.

FIG. 5 is a block diagram of a USB expanding device according to a fifth embodiment. As shown in FIG. 5, besides the first USB type-C connection unit 12, the second USB type-C connection unit 14, the main controller 18 and the transmission controller 16, the USB expanding device 10 further includes a fourth USB type-C connection unit 38 and a fifth USB type-C connection unit 40. The fourth USB type-C connection unit 38 includes a fourth USB type-C port 381, a fourth multiplexer 382 and a fourth power transmission controller 383. In an embodiment, the fourth USB type-C port 381 is connect with a first charger 42, and the first charger 42 supplies power to the first external device 20. The fourth multiplexer 382 is electrically connected to the fourth USB type-C port 381 and the fourth power transmission controller 383. Similarly, the fifth USB type-C connection unit 40 includes a fifth USB type-C port 401, a fifth multiplexer 402 and a fifth power transmission controller 403. The fifth USB type-C port 401 is connected to a second charger 44, the second charger 44 is supplies power to the second external device 22, and the fifth multiplexer 402 is electrically connected to the fifth USB type-C port 401 and the fifth power transmission controller 403. In an embodiment, the main controller 18 is electrically connected to the first power transmission controller 123, the second power transmission controller 143, the fourth power transmission controller 383 and the fifth power transmission controller 403. The first USB type-C port 121 of the first USB type-C connection unit 12 is connected to the fourth USB type-C port 381 of the fourth USB type-C connection unit 38 to use the first charger 42 to charge the first external device 20. The second USB type-C port 141 of the second USB type-C connection unit 14 is connected to the fifth USB type-C port 401 of the fifth USB type-C connection unit 40 to use the second charger 44 to charge the second external device 22.

In an embodiment, the first charger 42 is a standard charger of the first external device 20, and the second charger 44 is a standard charger of the second external device 22.

As shown in FIG. 5, a switching element 28 is provided in the USB expanding device 10 and is electrically connected to the main controller 18, and the switching element 28 is connected between the first USB type-C port 121 and the second USB type-C port 141. When the first charger 42 and the second charger 44 are unused, the main controller 18 controls the switching element 28 to be switched on, so that the first external device 20 and the second external device 22 perform power transmission through the power transmission channel established by the first USB type-C port 121, the conductive switching element 28, and the second USB type-C port 141. At this time, the first power transmission controller 123 and the second power transmission controller 143 communicate with each other through the main controller 18 to choose the charging protocol between the first external device 20 and the second external device 22, and then, the first power transmission controller 123 and the second power transmission controller 143 perform power transmission according to the charging protocol.

Any one of the foregoing charging modes does not affect the transmission of data or images, at this time, the first external device 20 and the second external device 22 continue to transmit data or images through the data transmission channel established by the first USB type-C port 121, the multiplexer 122, the transmission controller 16, the second multiplexer 142, and the second USB type-C port 141.

Figure 6:
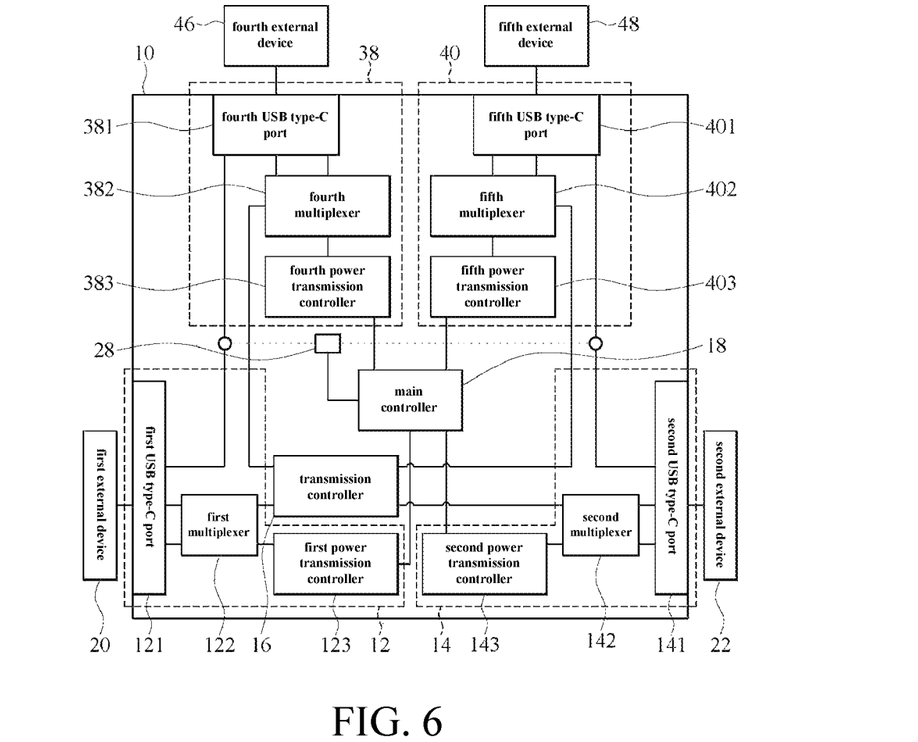
FIG. 6 is a block diagram of a USB expanding device according to a sixth embodiment.

FIG. 6 is a block diagram of a USB expanding device according to a sixth embodiment. Please refer to FIG. 6, the architecture of the sixth embodiment is mostly the same as the fifth embodiment, the difference is that the fourth USB type-C port 381 is connected to a fourth external device 46, the fifth USB type-C port 401 is connected to a fifth external device 48, and the transmission controller 16 is simultaneously electrically connected to the multiplexer 122, the second multiplexer 142, the fourth multiplexer 382, and the fifth multiplexer 402. In this way, since the first USB type-C port 121 is connected to the fourth USB type-C port 381, the fourth external device 46 is utilized for charging the first external device 20. The second USB type-C port 141 is connected to the fifth USB type-C port 401, and the fifth external device 48 is utilized for charging the second external device 22. On the other hand, the first external device 20, the second external device 22, the fourth external device 46 and the fifth external device 48 still transmit data or images through the data transmission channel established by the first USB type-C port 121, the multiplexer 122, the transmission controller 16, the second multiplexer 142, the fourth multiplexer 382, the fourth USB type-C port 381, the fifth multiplexer 402, and the fifth USB type-C port 401.

In an embodiment, the switching element 28 used in the FIG. 1 to FIG. 6 is, but not limited to, a transistor element or an integrated circuit (IC).

In some embodiments, as shown in FIG. 1 to FIG. 6, the first external device 20, the second external device 22, the third external device 36, the fourth external device 46, or the fifth external device 48 is, but not limited to, mobile phones, notebook computers, tablet computer, personal digital assistants (PDAs), etc. In another embodiment, the third external device 36, the fourth external device 46, or the fifth external device 48 is, but not limited to, desktop computers, industrial computers, etc.

Therefore, the USB expanding device of the embodiment provides two or more USB type-C connection units that simultaneously transfer data, images and power to each other. Multiple sets of the power transmission controllers are used to collocate with the main controller (MCU) for programmable control. While the USB type-C connection units are transmitting data or images between each other, the external DC power is distributed through the USB type-C connection units and the main controller according to the charging demand information or the charging protocol, such as power distribution of the external power supply or power distribution between the external devices. In this way, all the USB type-C connection units on the USB expanding device operate normally, and are not limited to connect to an upstream port. When the external power is not connected with the USB expanding device, the USB type-C connection units also transfer data, image and power to each other normally.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:
1. A USB expanding device, comprising:
 a plurality of USB type-C connection units, each of the USB type-C connection units includes:
 a USB type-C port, for connecting to an external device;
 a multiplexer, connected to the USB type-C port; and
 a power transmission controller, connected to the multiplexer;
 a transmission controller, connected to the multiplexers of the USB type-C connection units, for controlling the data transmission; and
 a main controller, connected to the power transmission controllers of the USB type-C connection units transmission, for performing a power distribution according to a charging demand information obtained from the power transmission controllers.

2. The USB expanding device according to claim 1, further comprising a power converter, the power converter is connected to the main controller and the USB type-C ports, wherein the main controller informs the power converter to perform the power distribution according to the charging demand information, to supply the power to the external devices separately.

3. The USB expanding device according to claim 2, wherein the power converter is a DC-DC (direct current to direct current) converter.

4. The USB expanding device according to claim 3, further comprising a charging connection unit, connected to the DC-DC converter to provide a DC power to the DC-DC converter.

5. The USB expanding device according to claim 4, wherein the charging connection unit is the USB type-C connection unit.

6. The USB expanding device according to claim 2, wherein the power converter is an AC-DC (alternating current-direct current) converter, for receiving an external AC power and converting the external AC power into a DC power.

7. The USB expanding device according to claim 1, further comprising a switching element, the switching element is connected with the USB type-C ports and the main controller, wherein the main controller controls the switching element to conduct selectively, for enabling the external devices to perform a power transmission through the power transmission channel established by the switching element and the USB type-C ports.

8. The USB expanding device according to claim 7, wherein, when the switching element is conducted, the power transmission controllers communicate with each other through the main controller to choose a charging protocol between the external devices, and the power transmission controllers perform the power transmission according to the charging protocol.

9. The USB expanding device according to claim 3, further comprising a mobile power module, the mobile power module is electrically connected to the DC-DC converter, to provide DC power to the DC-DC converter.

10. The USB expanding device according to claim 7, wherein, the external devices perform a data transmission or an image transmission through a data transmission channel established by the USB type-C ports, the multiplexers, and the transmission controller when the external devices perform the power transmission through the power transmission channel established by the USB type-C ports and the switching element.

* * * * *